United States Patent
Kao

(10) Patent No.: US 11,923,634 B2
(45) Date of Patent: Mar. 5, 2024

(54) CONNECTOR ASSEMBLY

(71) Applicant: Molex, LLC, Lisle, IL (US)

(72) Inventor: Ming-Huei Kao, New Taipei (TW)

(73) Assignee: Molex. LLC, Lisle, IL (US)

(*) Notice: Subject to any disclaimer, the term of this patent is extended or adjusted under 35 U.S.C. 154(b) by 287 days.

(21) Appl. No.: 17/528,189

(22) Filed: Nov. 17, 2021

(65) Prior Publication Data
US 2022/0173546 A1   Jun. 2, 2022

(30) Foreign Application Priority Data
Dec. 1, 2020 (CN) .......................... 202011387311.X

(51) Int. Cl.
*H01R 13/514* (2006.01)
*H01R 13/518* (2006.01)

(52) U.S. Cl.
CPC ......... *H01R 13/514* (2013.01); *H01R 13/518* (2013.01)

(58) Field of Classification Search
CPC .. H01R 13/46; H01R 13/502; H01R 13/5025; H01R 13/514; H01R 13/516; H01R 13/518
USPC ......................................................... 439/55
See application file for complete search history.

(56) References Cited

U.S. PATENT DOCUMENTS 10,153,571 B2   12/2018   Kachlic
2020/0275587 A1   8/2020   Chopra et al.

FOREIGN PATENT DOCUMENTS

| CN | 104470321 A | 3/2015 |
| CN | 108493647 A | 9/2018 |
| CN | 210404248 U | 4/2020 |
| TW | 201137419 A | 11/2011 |
| TW | 201925979 A | 7/2019 |
| WO | 2017019084 A1 | 2/2017 |

*Primary Examiner* — Khiem M Nguyen

(57) ABSTRACT

A connector assembly includes a cage, a receptacle connector and a partitioning frame. The receptacle connector is positioned in a rear segment of the cage and has an upper card slot and a lower card slot. The partitioning frame includes a compartment bracket and an extension bracket, the compartment bracket is provided in the cage, and the compartment bracket and the cage together define an upper receiving space which corresponds to the upper card slot and a lower receiving space which corresponds to the lower card slot, a rear end of the compartment bracket is positioned in front of the upper card slot and the lower card slot. The extension bracket is assembled to a rear end of the compartment bracket and is capable of moving relative to the compartment bracket between a front position and a rear position.

10 Claims, 9 Drawing Sheets

CONNECTOR ASSEMBLY

RELATED APPLICATIONS

This application claims priority to Chinese Patent Application No. 202011387311.X, filed Dec. 1, 2020, which is incorporated herein by reference in its entirety.

TECHNICAL FIELD

The present disclosure relates to a connector assembly, and particularly relates to a connector assembly having a partitioning frame.

BACKGROUND ART

Chinese disclosure patent application publication No. CN106469878A (corresponding to U.S. Pat. No. 10,153,571B2) discloses a connector system, a cage of the connector system includes an intermediate section, the intermediate section includes an upper wall and a lower wall, the upper wall and the lower wall together define an upper port and a lower port in the cage, the lower wall includes a hole formed thereon to make the intermediate section and the lower port communicated. A biasing heat sink of the connector system is arranged in the intermediate section which is between the upper port and the lower port, the biasing heat sink passes through the hole and extends into the lower port. The cage disclosed in such a connector system is positioned over a stack-type connector, an opening formed to a bottom portion of the cage makes that the stack-type connector can be arranged in the inside of the cage, a rear end of the intermediate section necessarily extends to between two receptacles of the stack-type connector which are arranged in an up-down direction. Therefore, when an assembling sequence between the stack-type connector and the cage is after an assembling sequence between the intermediate section and the cage, the intermediate section of the cage would interfere with the stack-type connector, such that the stack-type connector cannot smoothly enters into the cage.

SUMMARY

Therefore, an object of the present disclosure is to provide a connector assembly which can improve at least one deficiency in the prior art.

Accordingly, in some embodiment, a connector assembly of the present disclosure comprises a cage, a receptacle connector and a partitioning frame. The receptacle connector is provided in a rear segment of the cage, the receptacle connector has an upper card slot and a lower card slot. The partitioning frame comprises a compartment bracket and an extension bracket, the compartment bracket is provided in the cage, and the compartment bracket and the cage together define an upper receiving space which corresponds to the upper card slot and a lower receiving space which corresponds to the lower card slot, a rear end of the compartment bracket is positioned in front of a front end of the upper card slot and a front end of the lower card slot, the extension bracket is assembled to a rear end of the compartment bracket, the extension bracket is capable of moving relative to the compartment bracket between a front position which is positioned in front of the front end of the upper card slot and the front end of the lower card slot and a rear position which at least partially enters into between the upper card slot and the lower card slot.

In some embodiment, the connector assembly further comprises a holding member, the extension bracket has a first holding portion which latches to the holding member when the extension bracket is in the front position and a second holding portion which latches to the holding member when the extension bracket is in the rear position.

In some embodiment, the holding member is an elastic holding piece which is constructed on a side wall of the cage, a side wall of the extension bracket has a side plate which correspondingly engages with the elastic holding piece, a rear edge of the side plate constitutes the first holding portion, a front edge of the side plate constitutes the second holding portion.

In some embodiment, the side wall of the extension bracket further has a limiting hole which is positioned behind the side plate and is adjacent to the side plate, the side wall of the cage has a limiting piece which correspondingly enters into the limiting hole.

In some embodiment, a front inner side edge of the limiting hole and a rear edge of the side plate together constitute the first holding portion.

In some embodiment, a side wall of the compartment bracket has cutouts which allow the elastic holding piece and the limiting piece to pass through respectively.

In some embodiment, two side walls of the extension bracket each have a guiding piece, two side walls of the cage each have a guiding rail groove, the guiding piece is provided to the guiding rail groove in a manner that the guiding piece can slide in the front-rear direction.

In some embodiment, the two side walls of the compartment bracket each have a guiding piece receiving notch which is positioned to a rear end of the corresponding side wall, when the extension bracket is positioned in the front position, the guiding piece is received in the guiding piece receiving notch.

In some embodiment, the extension bracket has a lower stopping portion which enters into the lower receiving space, when the extension bracket is in the front position, a pluggable module which enters into the lower receiving space can push the lower stopping portion to make the extension bracket move rearwardly to the rear position.

In some embodiment, the compartment bracket has an upper wall and a lower wall which together define an interior receiving space, the lower wall is formed with a lower window which makes the interior receiving space communicated to the lower receiving space, the connector assembly further comprises an internal biasing heat sink which is provided to interior receiving space of the compartment bracket, the internal biasing heat sink has an internal heat dissipating member which passes through the lower window and enters into the lower receiving space, the internal heat dissipating member can be moved in the up-down direction, the extension bracket sheathes the internal heat dissipating member and is sheathed by the compartment bracket.

In the connector assembly of the present disclosure, with the extension bracket of the partitioning frame which can move between the front position and the rear position, the problem that the partitioning frame interferes with the receptacle connector in the assembling process can be avoided so as to be beneficial to the assembling operation.

BRIEF DESCRIPTION OF DRAWINGS

Other features and effects of the present disclosure will be apparent in an embodiment referring to the accompanying drawings in which.

DETAILED DESCRIPTION

Figure 1:
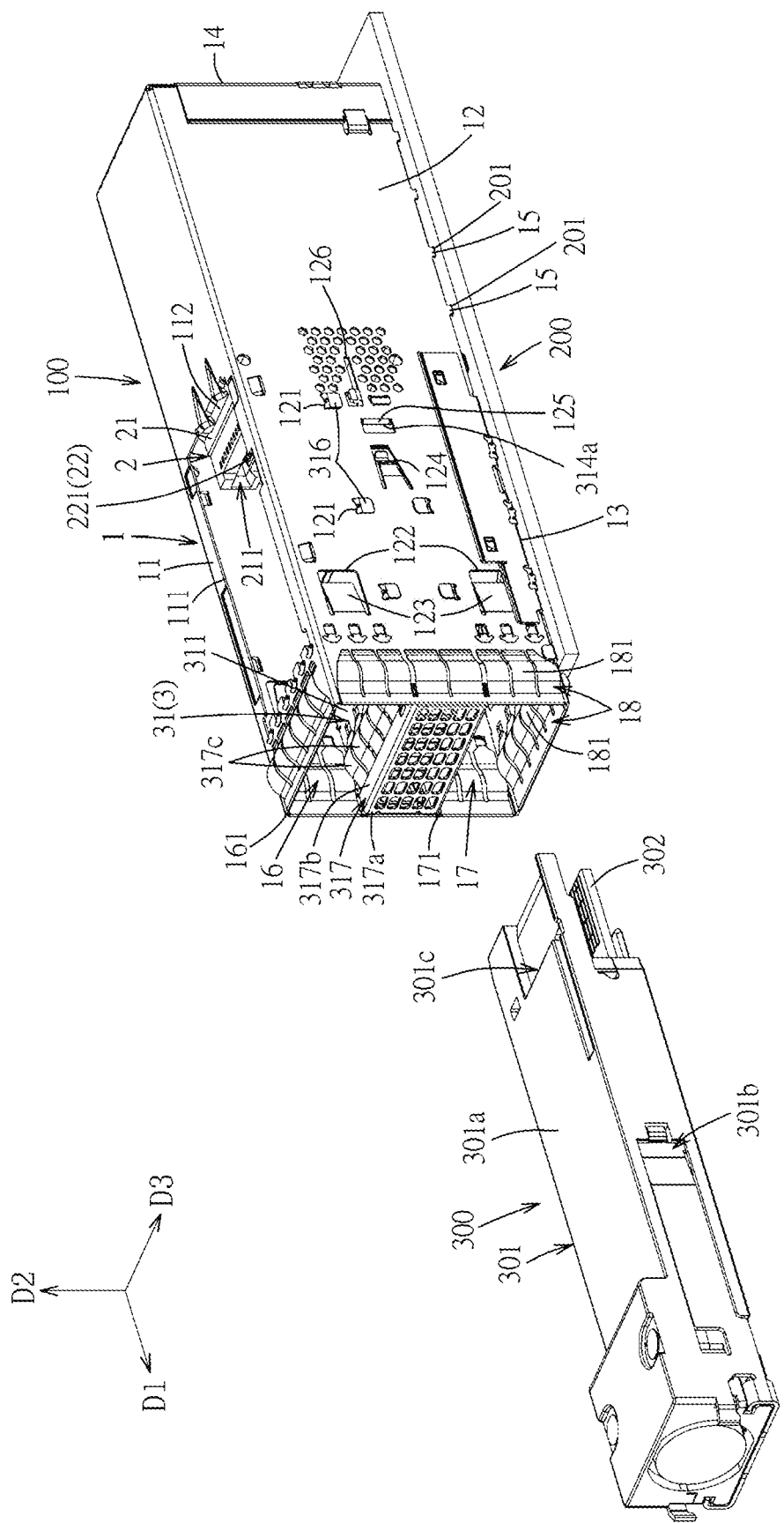
FIG. 1 is a perspective view of an embodiment of a connector assembly of the present disclosure mounted on a circuit board and facing a pluggable module.
Figure 2:
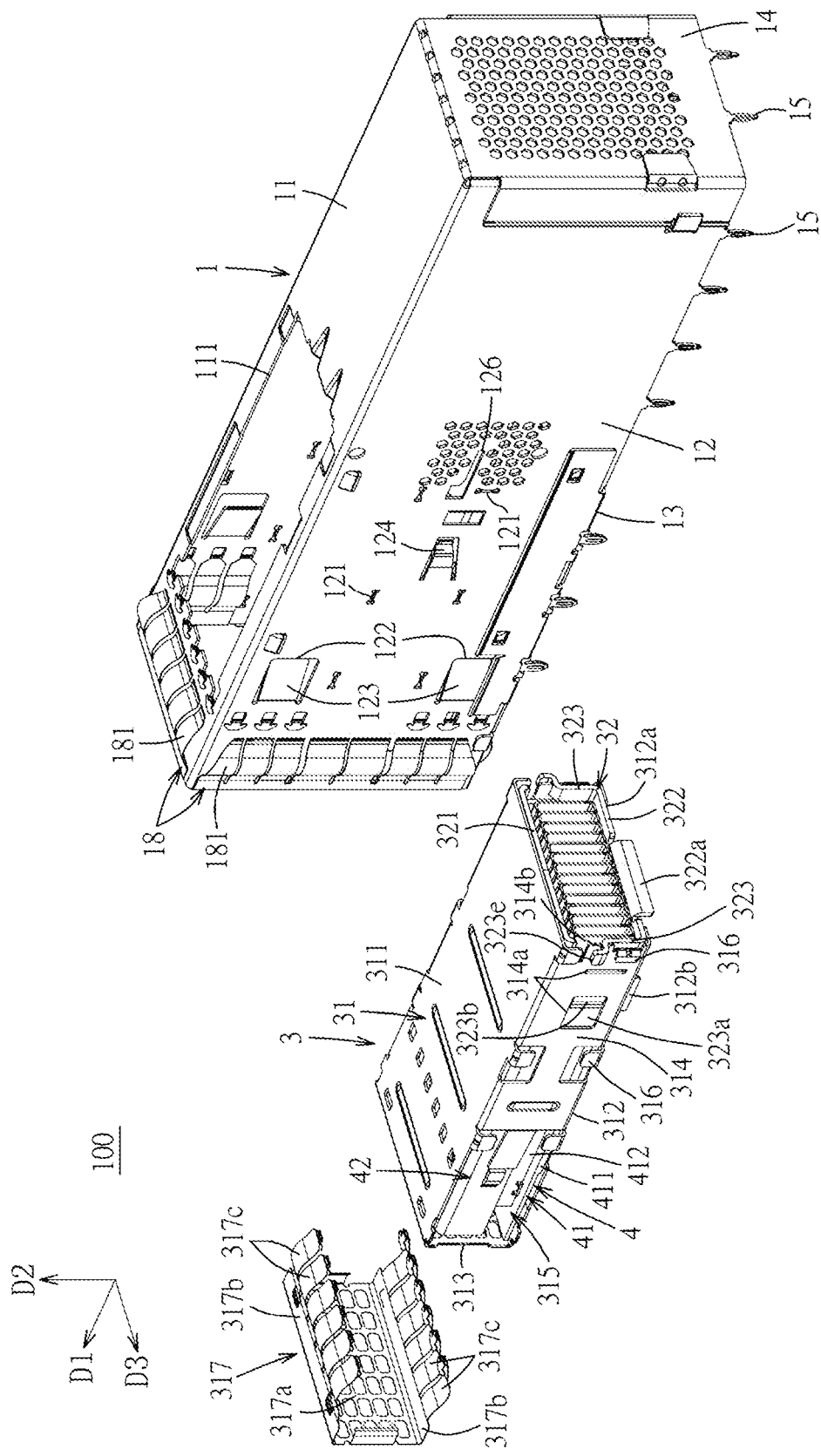
FIG. 2 is a perspective exploded view of the embodiment.
Figure 3:
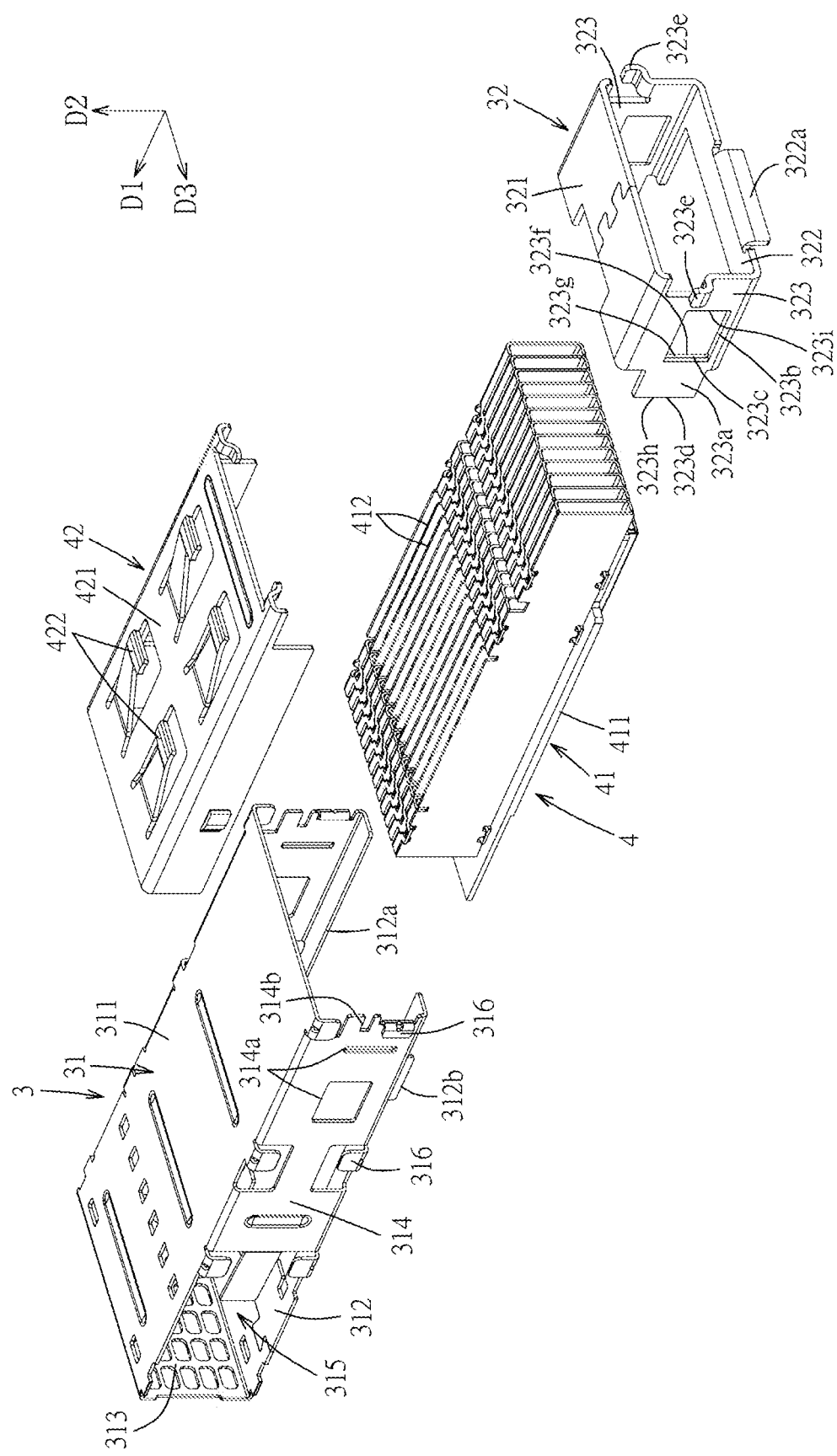
FIG. 3 is a perspective exploded view of a partitioning frame and an internal biasing heat sink of the embodiment.

Before the present disclosure is described in detail, it is noted that the similar components are indicated by the same reference numerals in the following description.

Referring to FIG. 1 to FIG. 4, an embodiment of a connector assembly 100 of the present disclosure is adapted to be provided to a circuit board 200 and is adapted to mate with a pluggable module 300. The connector assembly 100 includes a cage 1, a receptacle connector 2, a partitioning frame 3 and an internal biasing heat sink 4.

The cage 1, which for example can be formed by processing a metal plate through via stamping and bending, extends along a front-rear direction D1 (in which an arrow pointing direction is front and an opposite direction is rear) and has a top wall 11 which is positioned in the up in an up-down direction D2 (in which an arrow pointing direction is up and an opposite direction is down), two side walls 12 which extend downwardly from two sides of the top wall 11 and face each other in a left-right direction D3 (in which an arrow pointing direction is right and an opposite direction is left), a bottom wall 13 which is connected to front segments of bottom edges of the two side walls 12, a rear wall 14 which is connected to a rear edge of the top wall 11 and rear edges of the two side walls 12, and a plurality of press fit legs 15 which are formed to the bottom edges of the two side walls 12 and a bottom edge of the rear wall 14, the plurality of press fit legs 15 are used to press into a plurality of press fit holes 201 of the circuit board 200, so as to make the cage 1 fixedly provided on the circuit board 200 and capable of being electrically connected to a ground circuit (not shown) of the circuit board 200.

The receptacle connector 2 is provided on the circuit board 200 and provided in a rear segment of the cage 1, the receptacle connector 2 has a housing 21 which is insulative and a plurality of terminals 22 which are provided to the housing 21, the housing 21 has an upper card slot 211 and a lower card slot 212 which are toward the front and are arranged along the up-down direction D2, each terminal 22 has a contact portion 221 which is positioned in the upper card slot 211 or a lower card slot 212 and a tail portion 222 which extends downwardly from a bottom portion of the housing 21 and is used to be mechanically and electrically connected to the circuit board 200.

The partitioning frame 3 includes a compartment bracket 31 and an extension bracket 32, the compartment bracket 31 is provided in the cage 1, and the compartment bracket 31 and the cage 1 together define an upper receiving space 16 which corresponds to the upper card slot 211 of the receptacle connector 2 and a lower receiving space 17 which corresponds to the lower card slot 212 of the receptacle connector 2, furthermore, a rear segment of the upper receiving space 16 and a rear segment of the lower receiving space 17 are communicated with each other. The upper receiving space 16 has an insertion port 161 which is positioned in the front and allows the pluggable module 300 to insert into, the lower receiving space 17 has a lower insertion port 171 which is positioned in the front and allows the pluggable module 300 to insert into and a bottom opening 172 which is positioned behind the bottom portion and is defined together by the two side walls 12, the bottom wall 13 and the rear wall 14 of the cage 1, the bottom opening 172 allows the receptacle connector 2 to enter into so as to make the receptacle connector 2 received in the rear segment of the upper receiving space 16 and the rear segment of the lower receiving space 17 which are communicated with each other. In the present embodiment, the compartment bracket 31 has a upper wall 311 and a lower wall 312 which face each other in the up-down direction, a front wall 313 which is connected to a front edge of the upper wall 311 and a front edge of the lower wall 312, and two side walls 314 which are connected to side edges of the upper wall 311 and side edges of the lower wall 312, the upper wall 311, the lower wall 312, the front wall 313 and the two side walls 314 together define an interior receiving space 315. Each side wall 12 of the cage 1 has a fixing hole 121 which is penetratingly formed, the compartment bracket 31 further has fixing bendable pieces 316 which extend to outer sides of the two side walls 314, the fixing bendable pieces 316 respectively pass through the fixing holes 121 of the two side walls 12 and then are bent and fixed, therefore the compartment bracket 31 is stably assembled to the cage 1.

Referring to FIGS. 1-4, in the present embodiment, the connector assembly 100 may be provided to a mounting hole (not shown) of a casing (not shown), the cage 1 is provided with a plurality of first ground members 18 which are positioned at a front end of the cage 1, the compartment bracket 31 further is provided with a second ground member 317 which is positioned at the front wall 313 and a front segment of the upper wall 311 and a front segment of the lower wall 312. The first ground member 18 has a plurality of elastic fingers 181 which extend rearwardly from the front end of the cage 1 and are distributed to an outer side of the cage 1 and an inner side of the cage 1, the elastic finger 181 of the plurality of elastic fingers 181 which is positioned at the outer side of the cage 1 is used to contact an edge of the mounting hole of the casing, the elastic finger 181 of the plurality of elastic fingers 181 which is positioned at the inner side of the cage 1 is used to contact the pluggable module 300. The second ground member 317 has a sheet body 317a which is provided to a front side face of the front wall 313 of the compartment bracket 31 and two ground sheets 317b which respectively extend rearwardly from an upper edge of the sheet body 317a and a lower edge of the sheet body 317a to respectively enter into the upper receiving space 16 and the lower receiving space 17. Each ground sheet 317b has a plurality of elastic fingers 317c which extend rearwardly and are used to contact the pluggable module 300.

The pluggable module 300 has a shell 301 and a mating circuit board 302. The shell 301 has an inserting portion 301a which is used to insert into the upper receiving space 16 or the lower receiving space 17, the mating circuit board 302 protrudes from the inserting portion 301a, is provided to the inserting portion 301a and is used to insert into the upper card slot 211 or the lower card slot 212. Each side wall 12 of the cage 1 has two openings 122 which respectively correspond to the upper receiving space 16 and the lower receiving space 17, an inward extension elastic piece 123 is constructed at each opening 122 and obliquely extends rearwardly toward the inside of the cage 1. Two sides of inserting portion 301a of the pluggable module 300 in the left-right direction are provided with locking recessed grooves 301b which correspondingly engage with the inward extension elastic pieces 123, the inward extension elastic pieces 123 at the openings 122 are used to respectively engage with the locking recessed grooves 301b of the pluggable module 300 which inserts into the upper receiving space 16 or the lower receiving space 17, so as to generate a locking effect. In addition, an aligning structure 301c is further formed at a top portion of a front end of the inserting portion 301a of the shell 301. The top wall 11 of the cage 1 is formed with an upper window 111 which is communicated to the upper receiving space 16 and an upper stopping portion 112 which extends downwardly from a rear segment of the upper window 111 into the upper receiving space 16, the upper stopping portion 112 is used to stop the aligning structure 301c so as to limit an inserting position of the pluggable module 300. The lower wall 312 of the compartment bracket 31 is formed with a lower window 312a which makes the interior receiving space 315 communicated to the lower receiving space 17.

The internal biasing heat sink 4 is provided in the interior receiving space 315 of the compartment bracket 31 and has an internal heat dissipating member 41 and a biasing spring 42 which is provided between the internal heat dissipating member 41 and the upper wall 311 of the compartment bracket 31. The internal heat dissipating member 41 has a base plate 411 and a plurality of heat dissipating fins 412 which are arranged side by side along the left-right direction D3, latch with each other and are provided to a top face of the base plate 411, the base plate 411 has a thermal coupling portion 411a which passes through the lower window 312a and enters into the lower receiving space 17. The biasing spring 42 has a pressing plate 421 which presses against top portions of the heat dissipating fins 412 of the internal heat dissipating member 41 and a plurality of plate-shaped spring pieces 422 which extend from the pressing plate 421 and abut against the upper wall 311 of the compartment bracket 31, it is noted that, the biasing spring 42 also may be other forms of spring structures and is not limited to the present embodiment. A biasing force applied by the biasing spring 42 makes that the internal heat dissipating member 41 can be moved along the up-down direction D2 and makes the thermal coupling portion 411a of the internal heat dissipating member 41 elastically contact the pluggable module 300 which inserts into the lower receiving space 17, so as to ensure completeness of contact and strengthen heat dissipating performance.

Referring to FIG. 3 to FIG. 7, a rear end of the compartment bracket 31 is positioned in front of a front end of the upper card slot 211 and a front end of the lower card slot 212, the extension bracket 32 is assembled to the rear end of the compartment bracket 31. Specifically, in the present embodiment, the extension bracket 32 sheathes the internal heat dissipating member 41 and is sheathed by the compartment bracket 31, and the compartment bracket 31 limits movement of the extension bracket 32 in the up-down direction D2 and the left-right direction D3 so as to make the extension bracket 32 capable of moving move between a front position which is in front of the front end of the upper card slot 211 and the front end of the lower card slot 212 (see FIG. 4) and a rear position which at least partially enters into between the upper card slot 211 and the lower card slot 212 (see FIG. 6) relative to the compartment bracket 31. Because in an assembling situation, the receptacle connector 2 is firstly mounted to the circuit board 200, then the cage 1 provided with the partitioning frame 3 covers the receptacle connector 2 and is fixed to the circuit board 200, so when the extension bracket 32 is positioned in the front position which is in front of the front end of the upper card slot 211 and the front end of the lower card slot 212, the extension bracket 32 can avoid the upper card slot 211 of the receptacle connector 2 so as to avoid the extension bracket 32 interfering with the upper card slot 211 of the receptacle connector 2 to affect the assembling, and after the assembling is completed, the extension bracket 32 may be moved rearwardly to enter into the rear position which is between the upper card slot 211 and the lower card slot 212, so as to make the partitioning frame 3 play the complete partition function. Generally, with the extension bracket 32 of the partitioning frame 3 which can move between the front position and the rear position, under a precondition that the partitioning frame 3 can play the complete partition function in a subsequent use, a problem that the partitioning frame 3 interferes with the receptacle connector 2 in the assembling process can be avoided so as to be beneficial to assembling operation.

Referring to FIG. 4 to FIG. 7, in the present embodiment, the extension bracket 32 has an upper wall 321 and a lower wall 322 which face each other in the up-down direction and two side walls 323 which are connected to side edges of the upper wall 321 and side edges of the lower wall 322. The connector assembly 100 further includes a holding member, the extension bracket 32 has a first holding portion 323c which latches to the holding member when the extension bracket 32 is in the front position and a second holding portion 323d which latches to the holding member when the extension bracket 32 is in the rear position. Specifically, in the present embodiment, the holding member is two elastic holding pieces 124 which are respectively constructed on the two side walls 12 of the cage 1 and which makes a tip thereof recessed inwardly, it is noted that, in other implementing manner, the two elastic holding pieces 124 (the holding member) also may be respectively constructed on the two side walls 314 of the compartment bracket 31, so it is not limited to the present embodiment. Each side wall 323 of the extension bracket 32 has a side plate 323a which correspondingly engages with the elastic holding piece 124 and a limiting hole 323b which is positioned behind the side plate 323a and is adjacent to the side plate 323a. A front inner side edge 323f of the limiting hole 323b and a rear edge 323g of the side plate 323a together constitute the first holding portion 323c, a front edge 323h of the side plate 323a constitutes the second holding portion 323d.

Referring to FIG. 5, FIG. 7, FIG. 8 and FIG. 9, in addition, each side wall 12 of the cage 1 further has a limiting piece 125 which is positioned behind the corresponding elastic holding piece 124 and is perpendicularly bent inwardly and recessed inwardly so as to correspondingly enter into the limiting hole 323b, each side wall 314 of the compartment bracket 31 has cutouts 314a which allow the elastic holding piece 124 and the limiting piece 125 respectively pass through. And, the two side walls 323 of the extension bracket 32 each have a guiding piece 323e which extends outwardly and bends upwardly, the two side walls 314 of the compartment bracket 31 each have a guiding piece receiving notch 314b which is positioned at a rear end of the corresponding side wall 314 and is used to receive a part of the guiding piece 323e which extends outwardly, the two side walls 12 of the cage 1 each have a guiding rail groove 126, the part of the guiding piece 323e which extends outwardly is provided to the guiding rail groove 126 in a manner that the part of the guiding piece 323e which extends outwardly can slide in the front-rear direction, in addition, an area of a front end of the guiding rail groove 126 is larger, so a part of the guiding piece 323e which bends upwardly can correspondingly pass through the guiding rail groove 126 in the assembling process.

Figure 4:
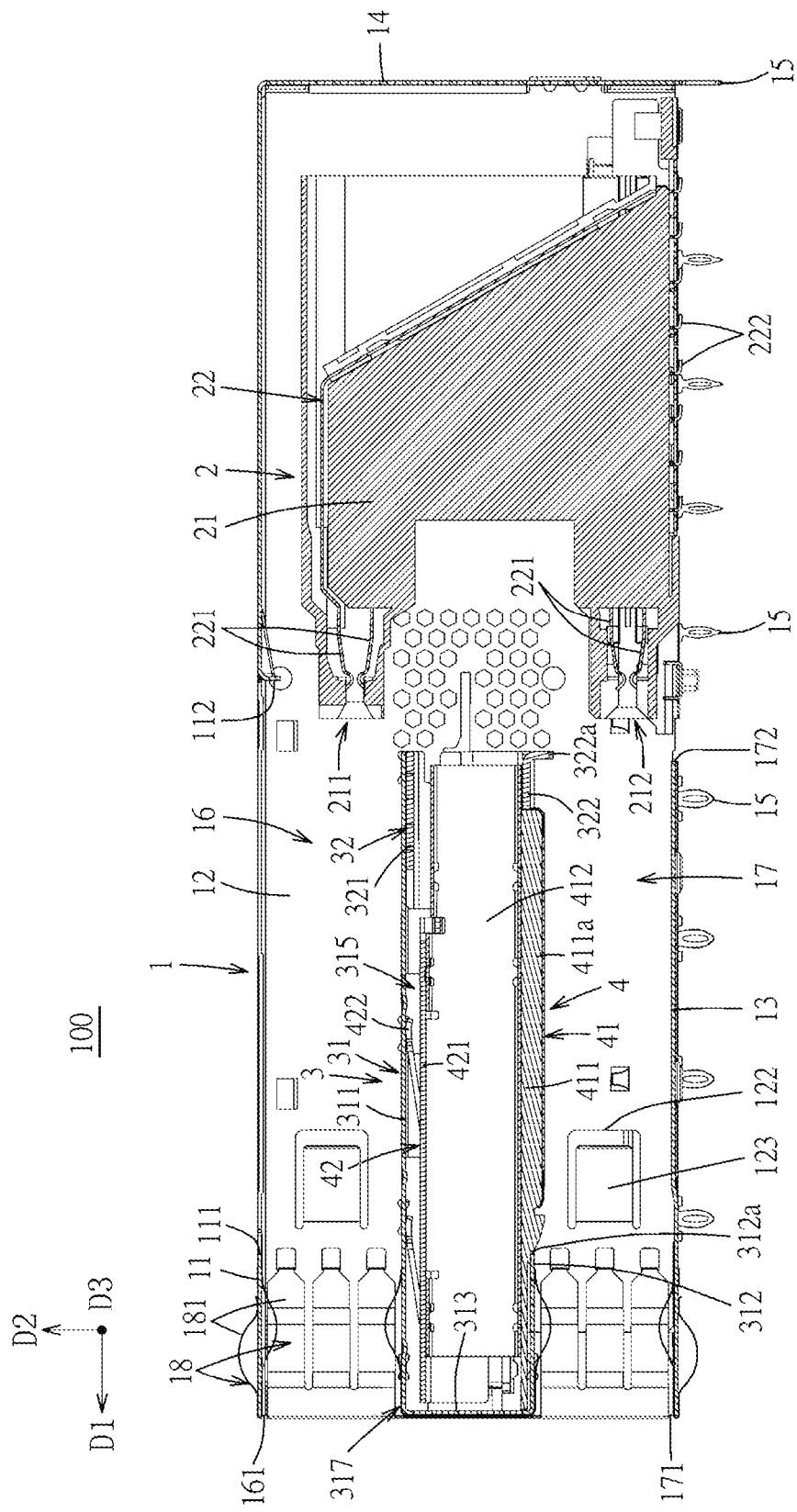
FIG. 4 is a cross sectional view of the embodiment, in which an extension bracket of the partitioning frame of the embodiment is positioned in a front position.
Figure 5:
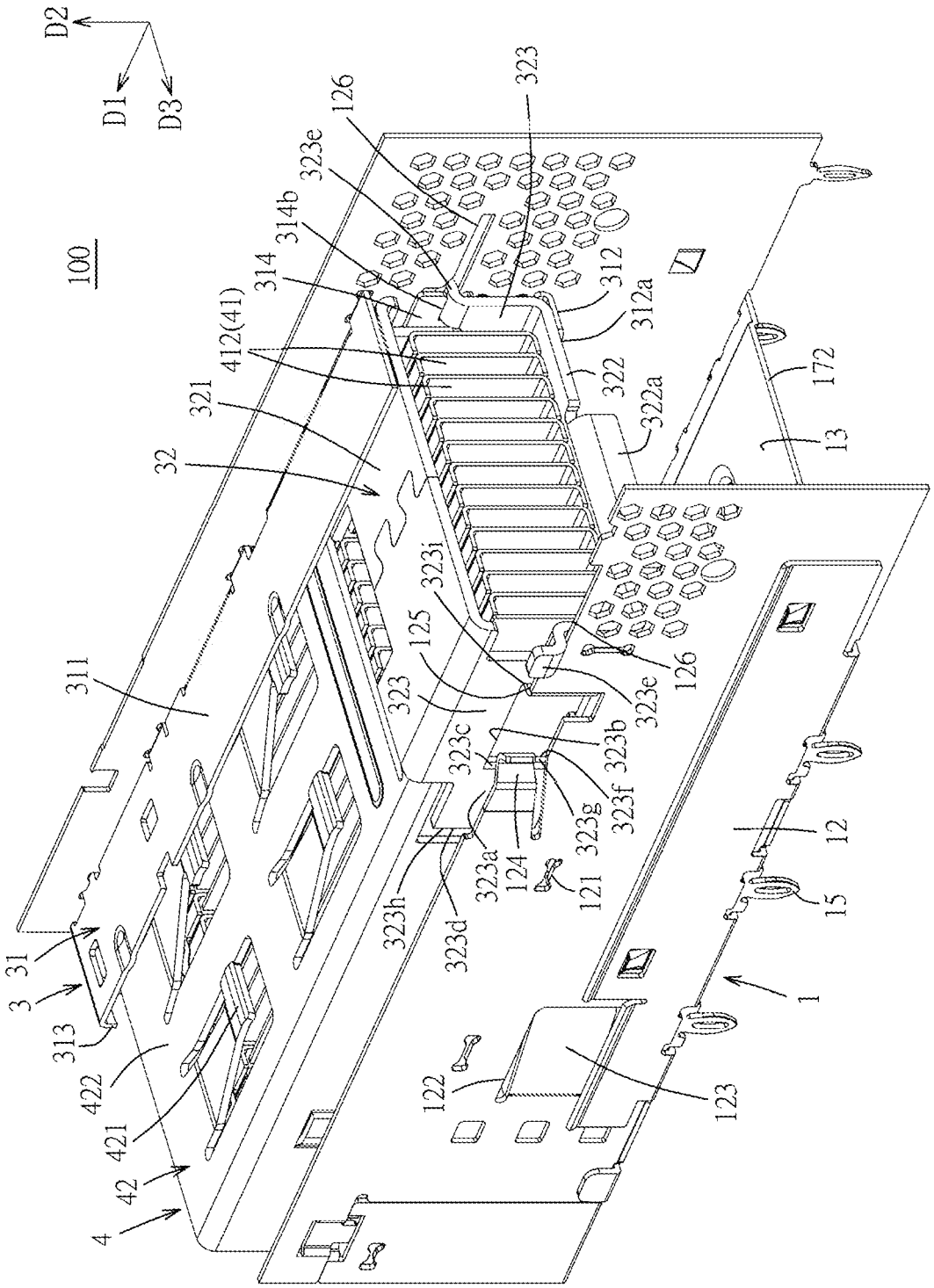
FIG. 5 is a partial perspective view of the embodiment, in which the extension bracket of the partitioning frame of the embodiment is positioned in the front position.
Figure 6:
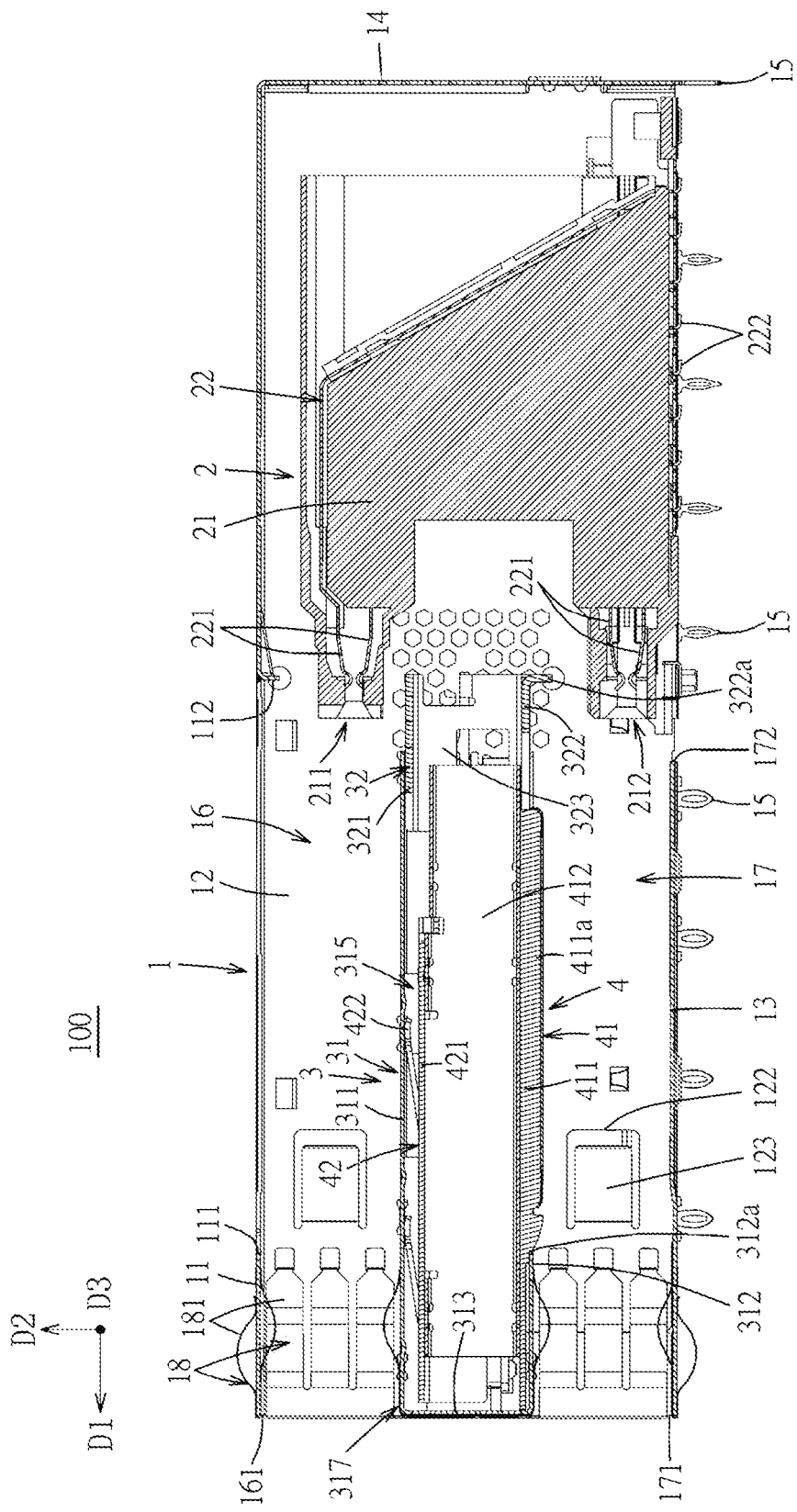
FIG. 6 is a cross sectional view of the embodiment, in which the extension bracket of the partitioning frame of the embodiment is positioned in a rear position.
Figure 7:
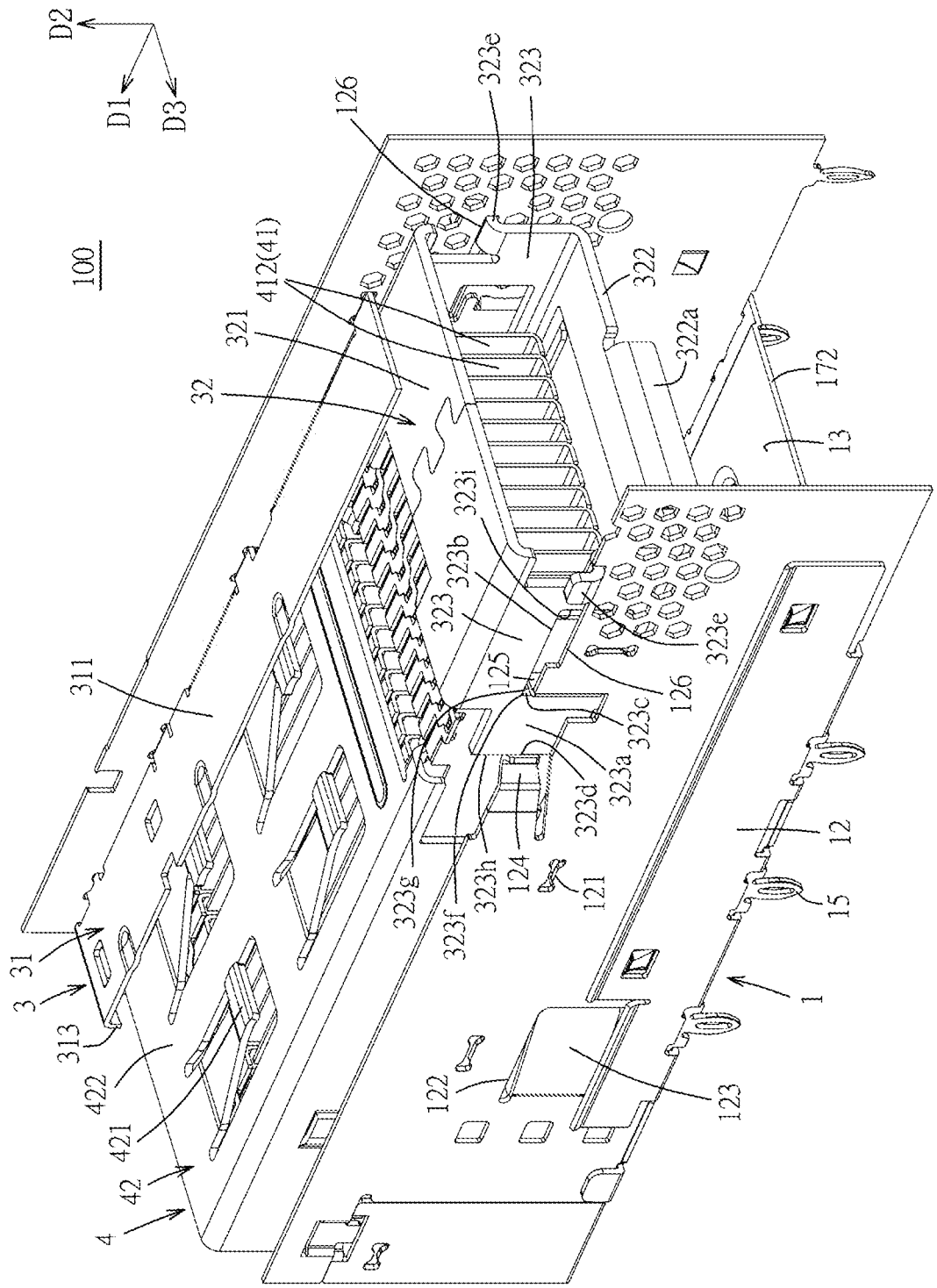
FIG. 7 is a partial perspective view of the embodiment, in which the extension bracket of the partitioning frame of the embodiment is positioned in the rear position.
Figure 8:
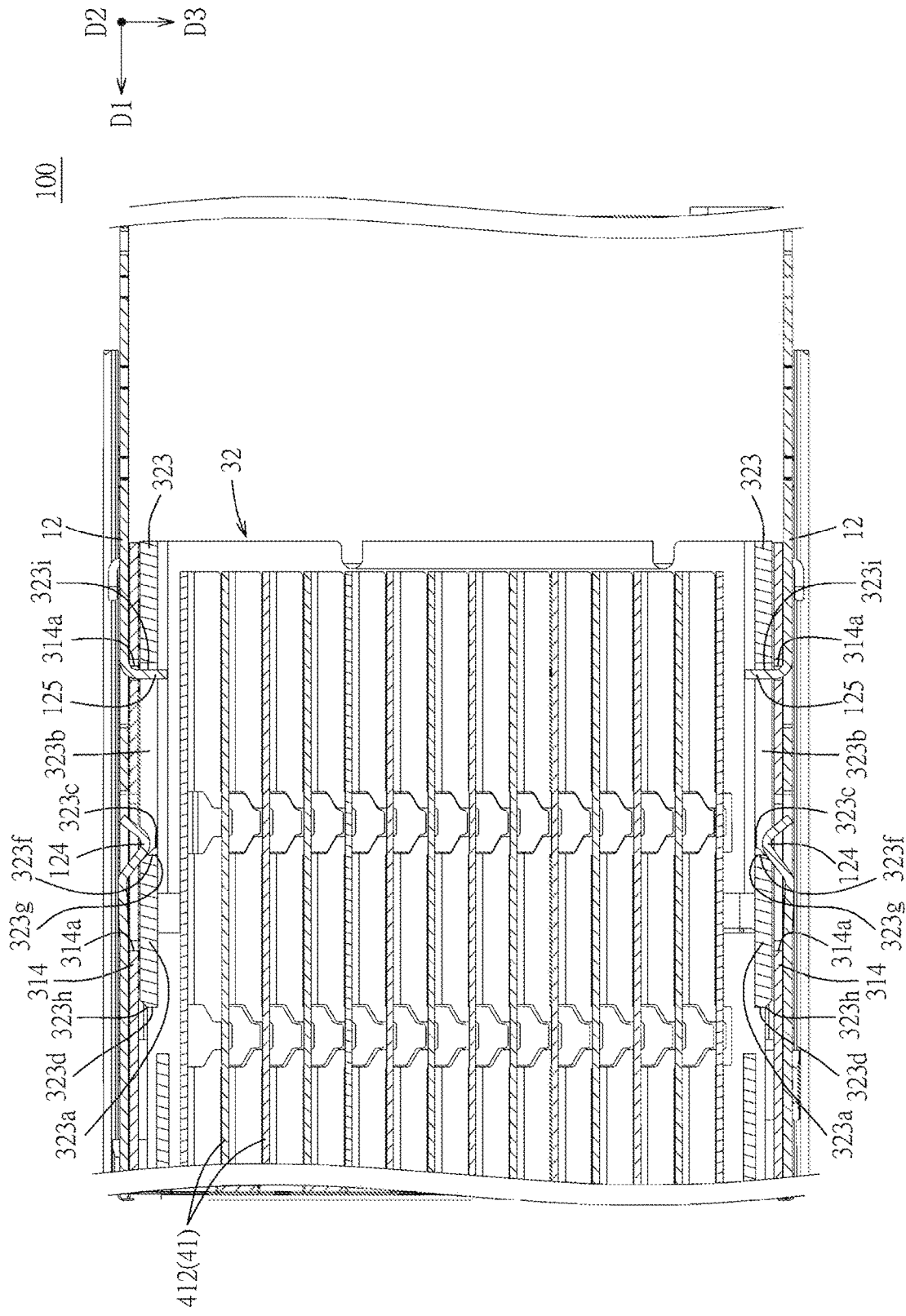
FIG. 8 is another cross sectional view of the embodiment viewed from another angle, in which the extension bracket of the partitioning frame of the embodiment is positioned in the front position.
Figure 9:
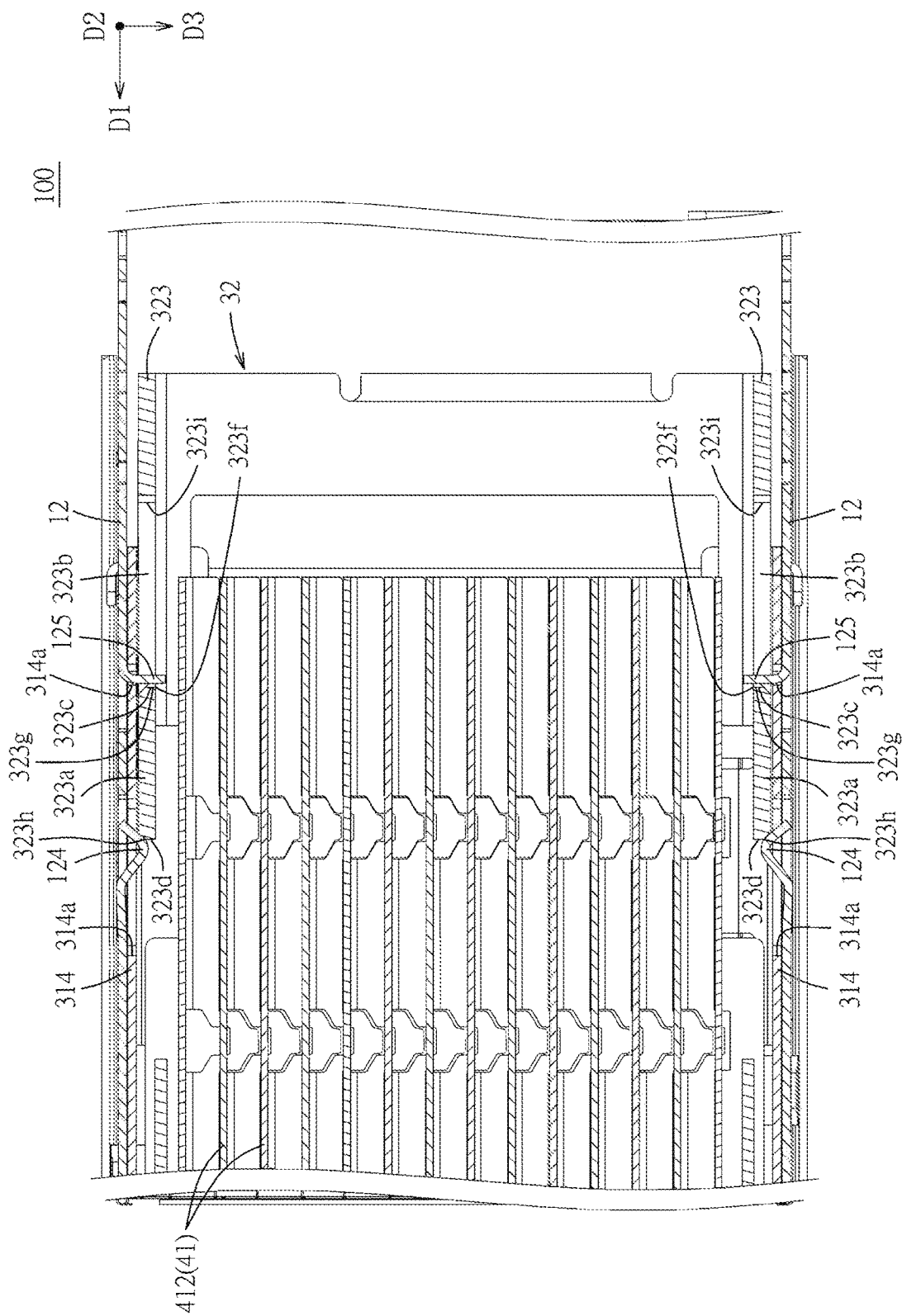
FIG. 9 is another cross sectional view of the embodiment viewed from another angle, in which the extension bracket of the partitioning frame of the embodiment is positioned in the rear position.

Specifically, referring to FIG. 4 to FIG. 6, when the extension bracket 32 is in the front position, the elastic holding piece 124 (the holding member) latches to the first holding portion 323c which is constituted together by the front inner side edges 323f of the limiting holes 323b and the rear edges 323g of the side plates 323a, the limiting piece 125 abuts against the rear inner side edge 323i of the limiting hole 323b, the guiding piece 323e is received in the guiding piece receiving notch 314b and is positioned to the front end of the guiding rail groove 126; referring to FIG. 7 to FIG. 9, when the extension bracket 32 moves from the front position to the rear position, the elastic holding piece 124 (the holding member) passes over the side plate 323a and latches to the second holding portion 323d which is constituted by the front edge 323h of the side plate 323a, the limiting piece 125 abuts against the front inner side edge 323f of the limiting hole 323b, the guiding piece 323e leaves the guiding piece receiving notch 314b and moves to a rear end of the guiding rail groove 126. By that the elastic holding piece 124 (the holding member) and the first holding portion 323c and the second holding portion 323d correspondingly latch to each other and engage with each other, the extension bracket 32 can be positioned in the front position and the rear position, and by that the limiting piece 125 and the limiting hole 323b correspondingly engage with each other and the guiding piece 323e and the guiding rail groove 126 corresponding engage with each other, the extension bracket 32 can be sufficiently guided, limited in position and supported.

Referring to FIG. 4 to FIG. 7, in addition, in the present embodiment, the lower wall 312 of the compartment bracket 31 further is formed with an aligning portion 312b which bends downwardly from a position at the lower window 312a, protrudes to enter into the lower receiving space 17 and is used to align with and guide the aligning structure 301c of the pluggable module 300 (see FIG. 1), the lower wall 322 of the extension bracket 32 has a lower stopping portion 322a which enters into the lower receiving space 17 and is used to stop the aligning structure 301c of the pluggable module 300 so as to limit the inserting position of the pluggable module 300, when the extension bracket 32 is in the front position, the pluggable module 300 which enters into the lower receiving space 17 can push the lower stopping portion 322a so as to make the extension bracket 32 move rearwardly to the rear position, so that the pluggable module 300 which enters into the lower receiving space 17 at the first time can use the lower stopping portion 322a to push the extension bracket 32 rearwardly to the rear position, so as to omit a manual operation step when the assembling is performed.

In conclusion, in the connector assembly 100 of the present disclosure, with the extension bracket 32 of the partitioning frame 3 which can move between the front position and the rear position, the problem that the partitioning frame 3 interferes with the receptacle connector 2 in the assembling process can be avoided so as to be beneficial to the assembling operation.

However, the above description is only for the embodiments of the present disclosure and it is not intended to limit the implementing scope of the present disclosure, and the simple equivalent changes and modifications made according to the claims and the contents of the specification are still included in the scope of the present disclosure.

The invention claimed is:

1. A connector assembly comprising:
   a cage;
   a receptacle connector provided in a rear segment of the cage, the receptacle connector having an upper card slot and a lower card slot; and
   a partitioning frame comprising a compartment bracket and an extension bracket, the compartment bracket being provided in the cage, and the compartment bracket and the cage together defining an upper receiving space which corresponds to the upper card slot and a lower receiving space which corresponds to the lower card slot, a rear end of the compartment bracket being positioned in front of a front end of the upper card slot and a front end of the lower card slot, the extension bracket being assembled to a rear end of the compartment bracket, the extension bracket being capable of moving relative to the compartment bracket between a front position which is positioned in front of the front end of the upper card slot and the front end of the lower card slot and a rear position which at least partially enters into between the upper card slot and the lower card slot.

2. The connector assembly of claim 1, wherein
   the connector assembly further comprises a holding member,
   the extension bracket has a first holding portion which latches to the holding member when the extension bracket is in the front position and a second holding portion which latches to the holding member when the extension bracket is in the rear position.

3. The connector assembly of claim 2, wherein
   the holding member is an elastic holding piece which is constructed on a side wall of the cage,
   a side wall of the extension bracket has a side plate which correspondingly engages with the elastic holding piece, a rear edge of the side plate constitutes the first holding portion, a front edge of the side plate constitutes the second holding portion.

4. The connector assembly of claim 3, wherein
   the side wall of the extension bracket further has a limiting hole which is positioned behind the side plate and is adjacent to the side plate,
   the side wall of the cage has a limiting piece which correspondingly enters into the limiting hole.

5. The connector assembly of claim 4, wherein a front inner side edge of the limiting hole and a rear edge of the side plate together constitute the first holding portion.

6. The connector assembly of claim 5, wherein a side wall of the compartment bracket has cutouts which allow the elastic holding piece and the limiting piece to pass through respectively.

7. The connector assembly of claim 1, wherein
two side walls of the extension bracket each have a guiding piece,
two side walls of the cage each have a guiding rail groove,
the guiding piece is provided to the guiding rail groove in a manner that the guiding piece can slide in the front-rear direction.

8. The connector assembly of claim 7, wherein
the two side walls of the compartment bracket each have a guiding piece receiving notch which is positioned to a rear end of the corresponding side wall,
when the extension bracket is positioned in the front position, the guiding piece is received in the guiding piece receiving notch.

9. The connector assembly of claim 1, wherein
the extension bracket has a lower stopping portion which enters into the lower receiving space,
when the extension bracket is in the front position, a pluggable module which enters into the lower receiving space can push the lower stopping portion to make the extension bracket move rearwardly to the rear position.

10. The connector assembly of claim 1, wherein
the compartment bracket has an upper wall and a lower wall which together define an interior receiving space, the lower wall is formed with a lower window which makes the interior receiving space communicated to the lower receiving space,
the connector assembly further comprises an internal biasing heat sink which is provided to interior receiving space of the compartment bracket, the internal biasing heat sink has an internal heat dissipating member which passes through the lower window and enters into the lower receiving space, the internal heat dissipating member can be moved in the up-down direction,
the extension bracket sheathes the internal heat dissipating member and is sheathed by the compartment bracket.

* * * * *